United States Patent
Bhogal et al.

(10) Patent No.: US 10,560,725 B2
(45) Date of Patent: *Feb. 11, 2020

(54) AGGREGATED REGION-BASED REDUCED BANDWIDTH VIDEO STREAMING

(71) Applicant: International Business Machines Corporation, Armonk, NY (US)

(72) Inventors: Kulvir S. Bhogal, Fort Worth, TX (US); Jonathan F. Brunn, Logan, UT (US); Jeffrey R. Hoy, Gibsonia, PA (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,092

(22) Filed: Dec. 9, 2018

(65) Prior Publication Data

US 2019/0110086 A1    Apr. 11, 2019

Related U.S. Application Data

(63) Continuation of application No. 14/883,501, filed on Oct. 14, 2015, now Pat. No. 10,178,414.

(51) Int. Cl.
*H04N 21/2187*    (2011.01)
*H04N 21/238*    (2011.01)
(Continued)

(52) U.S. Cl.
CPC ....... *H04N 21/2187* (2013.01); *H04N 21/233* (2013.01); *H04N 21/23805* (2013.01); *H04N 21/4728* (2013.01); *H04N 21/845* (2013.01)

(58) Field of Classification Search
None
See application file for complete search history.

(56) References Cited

U.S. PATENT DOCUMENTS 6,716,168 B2 *  4/2004  Nock ............... A61M 37/0092
                                                     600/439
6,917,719 B2    7/2005  Krishnamurthy et al.
(Continued)

FOREIGN PATENT DOCUMENTS

WO    2011087356 A1    7/2011
WO    2014024475 A1    2/2014

OTHER PUBLICATIONS

Author Unknown, IP Camera Glossary, AVer USA, Archived Webpage/site, Oct. 11, 2014, pp. 1-11, AVer Information Inc., Published at: http://www.averusa.com/surveillance/products/ip-cameras/glossary.asp.

(Continued)

*Primary Examiner* — Mohammad J Rahman
(74) *Attorney, Agent, or Firm* — Robert C. Bunker (57) ABSTRACT

An indication is received, from a content viewing device used by a remote viewer, that specifies a video content sub-area of interest within streamed video content viewed by the remote viewer. Original video content outside of the video content sub-area of interest is designated as a region not of interest (RNOI) within the streamed video content. A transmission rate of image changes of the original video content within the RNOI is reduced within the streamed video content. Image disparity between the video content sub-area of interest and the RNOI is reduced by continuing to transmit the image changes of the original video content within the RNOI at the reduced transmission rate. Bandwidth consumed to transmit the streamed video content is reduced in relation to the reduced transmission rate of the image changes of the original video content within the RNOI.

20 Claims, 6 Drawing Sheets (51) Int. Cl.
*H04N 21/233* (2011.01)
*H04N 21/845* (2011.01)
*H04N 21/4728* (2011.01)

(56) References Cited

U.S. PATENT DOCUMENTS

| | | | |
|---|---|---|---|
| 7,894,531 | B1 | 2/2011 | Cetin et al. |
| 8,358,327 | B2 | 1/2013 | Duddy et al. |
| 8,768,084 | B2 | 7/2014 | Wang et al. |
| 9,001,183 | B2 | 4/2015 | Mauchly |
| 9,785,817 | B2 | 10/2017 | Gagliano |
| 2001/0047517 | A1 | 11/2001 | Chrsitopoulos et al. |
| 2003/0123751 | A1 | 7/2003 | Krishnamurthy et al. |
| 2004/0088732 | A1 | 5/2004 | Martin et al. |
| 2006/0062478 | A1 | 3/2006 | Cetin et al. |
| 2006/0204113 | A1 | 9/2006 | Wang et al. |
| 2007/0206873 | A1 | 9/2007 | Schwenke et al. |
| 2008/0036864 | A1 | 2/2008 | McCubbrey et al. |
| 2011/0160882 | A1 | 6/2011 | Gupta et al. |
| 2011/0235706 | A1 | 9/2011 | Demircin et al. |
| 2012/0254717 | A1 | 10/2012 | Dey et al. |
| 2012/0314948 | A1 | 12/2012 | Raveendran et al. |
| 2013/0251031 | A1 | 9/2013 | Yitschak et al. |
| 2013/0336531 | A1 | 12/2013 | Bobbitt et al. |
| 2013/0336552 | A1* | 12/2013 | Sehnert .............. A61B 6/469 382/128 |
| 2014/0136686 | A1 | 5/2014 | Tsai et al. |
| 2014/0204995 | A1 | 7/2014 | Dzik |
| 2014/0320587 | A1 | 10/2014 | Oyman |
| 2015/0016510 | A1 | 1/2015 | Carlsson et al. |
| 2015/0023407 | A1 | 1/2015 | Sato |
| 2016/0028949 | A1 | 1/2016 | Lee et al. |
| 2016/0165309 | A1 | 6/2016 | Van Brandenburg et al. |
| 2016/0350569 | A1 | 12/2016 | Gagliano |
| 2017/0054987 | A1 | 2/2017 | Rangarajan et al. |
| 2017/0111671 | A1 | 4/2017 | Bhogal et al. |
| 2017/0118540 | A1 | 4/2017 | Thomas et al. |
| 2018/0376122 | A1* | 12/2018 | Park .................. H04N 13/128 |
| 2019/0235511 | A1* | 8/2019 | Tiwari ................. G01B 21/18 |

OTHER PUBLICATIONS

Author Unknown, Media Room Press: AVer implements new Smart Stream and ROI features for key IP cameras, AVer USA, Archived Webpage/site, Apr. 29, 2013, pp. 1-2, AVer Information Inc., Published at: http://www.aver.com/press-release/new-Smart-Stream-and-ROI-features-for-key-IP-cameras.

Rafael Ballagas, et al., Sweep and Point & Shoot: Phonecam-Based Interactions for Large Public Displays, In Proceedings of Extended Abstracts on Human Factors in Computing Systems, Apr. 2, 2005, pp. 1200-1203, Association for Computing Machinery, New York, NY, USA.

Daniel Florencio, et al., Microphone Array, Microsoft Research, Printed from website on Oct. 14, 2015, pp. 1-5, Microsoft, Published at: http://research.microsoft.com/en-us/projects/Microphone_Array/.

Setu Garg, et al., Rotating Camera Based on Speaker Voice, International Journal of Advanced Research in Electrical, Electronics and Instrumentation Engineering, May 2013, pp. 1674-1681, vol. 2, Issue 5, IJAREEIE, Published at: http://www.ijareeie.com/upload/may/3_Rotating.pdf.

Author Unknown, Product Information: Video Conference USB Rotating Cameras + Remote Controller, Hongkong Innovation Electronic Co., Ltd., Printed from website on Sep. 30, 2015, pp. 1-3, Focus Technology Co., Ltd., Published at: http://szinnovation588.en.made-in-china.com/product/PqpmEwlOnskD/China-Video-Conference-USB-Rotating-Cameras-Remote-Controller-C-008-.html.

Author Unknown, PTZ Cameras Vs. EPTZ Cameras—What is the Difference?, TrueLook, Printed from website on Sep. 30, 2015, pp. 1-8, TrueLook Construction Cameras, Published at: http://www.truelook.com/blog/ptz-cameras-vs-eptz-cameras-what-is-the-difference/.

Kota Yamaguchi, et al., PTZ Control with Head Tracking for Video Chat, In Proceedings of Extended Abstracts on Human Factors in Computing Systems, Apr. 4, 2009, pp. 3919-3924, Association for Computing Machinery, New York, NY, USA.

IBM, List of IBM Patents or Patent Applications Treated as Related, Applicant Appendix, Dec. 9, 2018, pp. 1-2, the contents of which are incorporated herein by reference in their entirety.

United States Patent and Trademark Office, Office Action for U.S. Appl. No. 14/883,501, dated Oct. 27, 2017, pp. 1-16, Alexandria, VA, USA.

United States Patent and Trademark Office, Office Action for U.S. Appl. No. 14/883,501, dated Apr. 24, 2018, pp. 1-10, Alexandria, VA, USA.

United States Patent and Trademark Office, Advisory Action for U.S. Appl. No. 14/883,501, dated Jul. 11, 2018, pp. 1-5, Alexandria, VA, USA.

United States Patent and Trademark Office, Notice of Allowance for U.S. Appl. No. 14/883,501, dated Sep. 11, 2018, pp. 1-8, Alexandria, VA, USA.

\* cited by examiner

AGGREGATED REGION-BASED REDUCED BANDWIDTH VIDEO STREAMING

BACKGROUND

The present invention relates to video streaming. More particularly, the present invention relates to aggregated region-based reduced bandwidth video streaming.

Video streams may be utilized to send video content from one location to another location. Video streams may be encoded in a variety of formats. The Moving Picture Expert Groups (MPEG) is an international standards organization that publishes a specific format for encoding of video data.

SUMMARY

A computer-implemented method includes receiving an indication, from each of a plurality of content viewing devices used by a plurality of remote viewers, that each specifies a respective individual video content sub-area of interest within streamed video content viewed by each of the plurality of remote viewers; defining an aggregated video content area of interest comprising a combination of each individually-specified video content sub-area of interest within the streamed video content; designating video content outside of the aggregated video content area of interest as a region not of interest (RNOI) within the streamed video content; and reducing, within the streamed video content, a transmission rate of image changes of video content within the RNOI, where bandwidth consumed to transmit the streamed video content is reduced in relation to the reduced transmission rate of the image changes of the video content within the RNOI.

A system that performs the computer-implemented method and a computer program product that causes a computer to perform the computer-implemented method are also described.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides aggregated region-based reduced bandwidth video streaming. The present technology solves a recognized bandwidth problem by providing technology that includes a new form of video bandwidth reduction that may be used to improve video distribution and processing within complex and distributed environments. For example, where video content is streamed from locations where available connectivity is insufficient to support high-bandwidth transmission, the technology described herein may decrease bandwidth utilization associated with certain "non-interest" regions of image content according to aggregated indications of viewer interest in other regions of the video content. As such, the technology described herein aggregates video content regions that have been indicated by different viewers to be of individualized interest to the respective viewers and preserves image quality for those individualized areas of interest as an aggregated set, while using a variety of techniques described below to reduce bandwidth consumption for the other "non-interest" regions of video content within the video stream. Examples of where the present technology may be applied include locations where news reporters may be covering a news story using portable equipment for audio/video uplink or during distributed video conferences that utilize multiple video feeds.

It is understood for purposes of the description herein that a video stream may include both image content and audio content, and that the terms "video stream" and "video content" as used herein for brevity include audio/video (A/V) streams/content as appropriate for a given implementation. However, certain enhancements to audio transmission are also described herein and form a part of the present technology.

The technology described herein operates by receiving an indication from each of multiple content viewing devices used by multiple remote viewers. Each received indication specifies a respective individual video content sub-area of interest within streamed video content viewed by each of the multiple remote viewers. An aggregated video content area of interest that includes a combination of each individually-specified video content sub-area of interest within the streamed video content is defined. Video content outside of the aggregated video content area of interest is designated as a region not of interest (RNOI) within the streamed video content. Within the streamed video content, a transmission rate of image changes of video content within the RNOI is reduced, and as a result bandwidth consumed to transmit the streamed video content is reduced in relation to the reduced transmission rate of the image changes of the video content within the RNOI.

One aspect of the technology described herein may utilize a super wide-angle camera or camera array capable of providing wide-angle coverage of the broadcast location. As an additional/alternative implementation, multiple distributed microphones at a location (e.g., conference room or news reporting region) may also be used to create a microphone array.

A primary video broadcast area may be of only a portion of the total available video content. Remote viewers may indicate their interest in receiving video content (and audio content) from additional and/or alternative areas of the available video and audio that may be captured and made available for transmission. As such, the remote viewers may each control an area from the wide angle (and/or the particular focus of the available audio) that is transmitted and viewed by the set of remote viewers. The remote viewers may change the view of the meeting and zoom without the camera being moved. The aggregated set of regions may include contiguous sets of regions of interest to the different remote viewers, may include overlapping regions of interest to the different remote viewers, and may include non-contiguous and/or non-overlapping sets of regions of interest to the different remote viewers.

The description herein focuses primarily on aggregation of video content regions of interest for ease of description. However, it is understood that aggregation of audio content may be implemented in association with any implementation consistent with the description herein.

The selection/indication of additional and/or alternative areas of the available video to capture, aggregate, and transmit to the remote viewers may be indicated by the remote viewers either though physical controls, detected eye movements, and/or gestures. An example gesture is movement by the remote viewer of a mobile device that is used as a client device by the remote viewer and that is rendering a view of the remote location. Within this example, the remote viewer may move their mobile client device left to move their effective viewing area to the left, and may move their mobile client device right to move their effective viewing area to the right. Similarly, the remote viewer may move their mobile client device up or down to move their selected effective viewing area up or down, respectively. As such, the mobile client device may become a movable virtual window into the remote event location (e.g., conference room) that is controlled by mobile client device movements by the remote viewer. This example implementation may also be extended to wearable devices, such as glasses or other forms of detectable directional control. Gyroscopes or any other suitable technology may be used to detect such movements.

The directional control signals from each remote viewer device may be transmitted to a server that controls and aggregates the portions of available video content that are transmitted. For example, video conference servers or other video servers may receive the directional control signals from a set of distributed remote video content viewing devices, and may adjust the video content that is streamed in accordance with an aggregation of the detected directional control signals. As such, the video servers may send discrete and independent sets of different portions of the available video content as an aggregated set of video content of interest to the remote viewers instead of sending a single unified video representation of the event location. In this manner, remote viewers may be provided with not only their own individualized preferred portion of available video content for viewing, but may also be provided with portions of video content that are of interest to other remote viewers.

As such, a number of remote viewers, such as remote video conference participants or remote news viewers, may simultaneously interact and control the display of a video conference or news presentation, respectively. This aggregated set of selected portions of available video content may allow new forms of interactions among the remote viewers, such as for commentary on different observations that are represented by each of the different remote viewers.

Further, as new remote viewers join an in-session conference or news feed, they may be presented with the current aggregated set of views so that the new remote viewers may quickly identify the "hot-spots" of interest to other previous/current viewers. As the new remote viewer contributes to the interactive aggregated set of selections, the new remote viewer may be integrated into the remote viewing experience.

With the aggregated regions of video content identified, bandwidth utilization may be reduced for other non-selected regions of video content based upon the aggregated remote viewers' interests. For this aspect of the present description, regions other than the aggregated video content regions that have been specified as being of interest to the respective remote viewers are considered regions that are not of interest (termed "regions not of interest"—RNOI) to the set of remote viewers in the aggregate.

It is understood that many forms of video and audio content encoding are possible and the subject matter described herein is intended to be applicable to any suitable encoding format(s). For example, where an aggregated set of available viewable areas have been identified as being of interest to a set of remote viewers, RNOI areas within the available video content may be transmitted at a lower video frequency.

Using Moving Picture Expert Groups (MPEG) terminology for purposes of example and not limitation, full/key frames (e.g., intra-coded frames (I-Frames)) of video content are understood to be fully "intra" coded and thereby carry information usable to render an entire image frame. Further, intermediate frames between I-Frames, such as predicted frames (P-Frames) and bi-directional predicted frames (B-Frames), transmit data changes to respective I-Frame data and image content. The description below utilizes the terms "intermediate frames" and "intermediate frame times" to refer to frames and periods of time, respectively (e.g., P-Frames and B-Frames), that without the technology described herein would encode all changes to video content according to a particular video encoding standard. The present technology operates, as described in more detail below, to reduce changes to video content during these intermediate frame times, and to thereby reduce bandwidth utilized to transmit these types of intermediate frames.

As such, the techniques described herein effectively change the frequency at which video content within the originating available image content changes within these RNOI areas during these intermediate frame times. Because the frequency of video content change is reduced, the bandwidth required to transmit the intermediate frames may also be accordingly reduced in size because the RNOI areas may change at a reduced/lower frequency.

Several different techniques may be used to reduce changes to video content within the RNOI regions during these intermediate frame times. For example, RNOI regions may be frozen (e.g., as still frame) to the video content transmitted during the previous I-Frame. In this manner, only the aggregated regions of interest to the set of viewers would change within the encoded video content during the interval between I-Frames.

Alternatively, the number of available intermediate frames between I-Frames (according to the encoding standard) may be divided into any suitable number of intermediate frame times, and content within the RNOI area may be partitioned according to the selected divisor. For purposes of description, the term "divisor" refers to a configured number of sections into which to partition the RNOI area. Content that is allowed to change within the partitioned RNOI area may be updated in a "round robin" or other partitioned region selection manner to allow content changes for one partitioned RNOI area within each intermediate frame (or each second, third, etc. intermediate frame according to the selected divisor). Using one of these alternative implementations, the remote viewers' experience and the appearance of change within the video content of the RNOI regions may be more gradual rather than only changing those regions at I-Frame boundaries, while still reducing bandwidth requirements to transmit the RNOI region as a whole. Video resolution may also be selectively reduced within the RNOI area, as appropriate for a given implementation, to further reduce bandwidth consumed to transmit the video content.

It should additionally be noted that one or more remote viewer devices may also incorporate a camera and may generate video content that is streamed as part of streaming video content to other of the respective viewing devices (e.g., as part of a multicast transmission or other streamed video content). The technology described herein may additionally be used within such an aggregated video environment to reduce bandwidth of certain streams that have not been indicated to be of interest to other remote viewers.

Audio streaming may also be changed based upon the aggregated areas of available video content that are being transmitted, which may give the remote viewers the impression that they are close to the area(s) being viewed and not just where the microphone happens to be located (e.g., in the front of the room where the conference presenter is located or only where the news reporter is located).

Further regarding audio processing augmentations that may be provided as part of the aggregated region-based reduced bandwidth video streaming, multiple microphones may be used within areas where multiple people are gathered at an event that is captured as a video stream, and microphones may be selectively used in this environment to allow individual viewers to focus their presented audio on subsets of the gathered persons. An event may include any gathering of people, such as break times at conferences where people congregate in groups, presentations or conferences where people are distributed to view the respective presentation, and other forms of gatherings where people are naturally distributed throughout an event location. Within this context, where a particular remote viewer (e.g., a remote conference participant) is interested in learning about or participating in a particular conversation with a specific subset of the people at the event, the remote viewer may indicate an area of the video stream being viewed that is associated with the people of interest and microphones located near those persons may be utilized to enhance an audio stream or to provide a separate audio stream to the remote viewer. Time delay estimates may be used to isolate different audio signals for each participant based on their respective selected viewing area. As such, the remote viewer may effectively zoom in on audio content within the room and may be provided with audio of specific remote conversations of interest to the viewer.

Additionally, as appropriate for a given implementation, a bi-directional audio feed may be provided by use of a distributed set of speakers, such as speakers distributed throughout a conference room. As such, where the remote viewer has indicated an interest in participating in a conversation, a two-way conversation may be conducted between a specific set of people at the event and the remote viewer. This technological aspect of the present subject matter allows remote conference/event participants to interact on an individualized level while being distributed at different physical locations.

It should be noted that conception of the present subject matter resulted from recognition of certain limitations associated with conventional video streaming technologies. It was observed that video content is increasingly being streamed by users from mobile devices to news agencies and that this video content is being published by the news agencies at an increasing rate. For example, mobile device users are streaming video content from mobile devices during traffic and weather events (e.g., snow storms, etc.), and during sporting or other events. Additionally news agencies themselves are sending reporters around the globe with mobile uplink equipment to gather news stories. These types of video streams originate from a variety of different locations around the globe with differing transmission infrastructure capabilities, such that some of these video streams are being relayed over cellular networks, satellite uplinks, and by use of differing technologies. As a result, it was observed that these technological differences in connectivity result in video content that may be grainy (low resolution/quality) and intermittent. Video conferencing and video communication applications are also being increasingly used to allow users to communicate with other users around the globe over Internet-based connections/applications, and infrastructure differences exist over networks that are used to transmit video conferencing/communication content at different conference locations. It was determined that these technological challenges are compounded where the video content is distributed to multiple viewers/users, each again with different platforms upon which the content is being viewed. It was also determined that the different users may have different interests with respect to portions of the video content that is being received, but that all users of conventional video streams receive the same video content. The new technology described herein addresses these technological issues by reducing bandwidth utilization of individual portions/regions of video content to improve video content clarity within the individual regions. This new technology further increases effective utilization of bandwidth by allowing users to provide indications of their respective areas/regions of interest, by aggregating these interest regions according to received indications from the users, and by reducing the frequency of transmission of other non-aggregated regions of video content. The present subject matter may improve video transmission bandwidth utilization by providing for technology that adaptively adjusts bandwidth utilized by different regions of video content within a video content stream, as described above and in more detail below. As such, improved video content streaming may be obtained through use of the present technology.

The aggregated region-based reduced bandwidth video streaming described herein may be performed in real time to allow prompt adjustment of bandwidth usage in association with aggregated regions of interest. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for ondemand information processing acceptable to a user of the subject matter described (e.g., within a portion of a second or within a few seconds). These terms, while difficult to precisely define are well understood by those skilled in the art.

Figure 1:
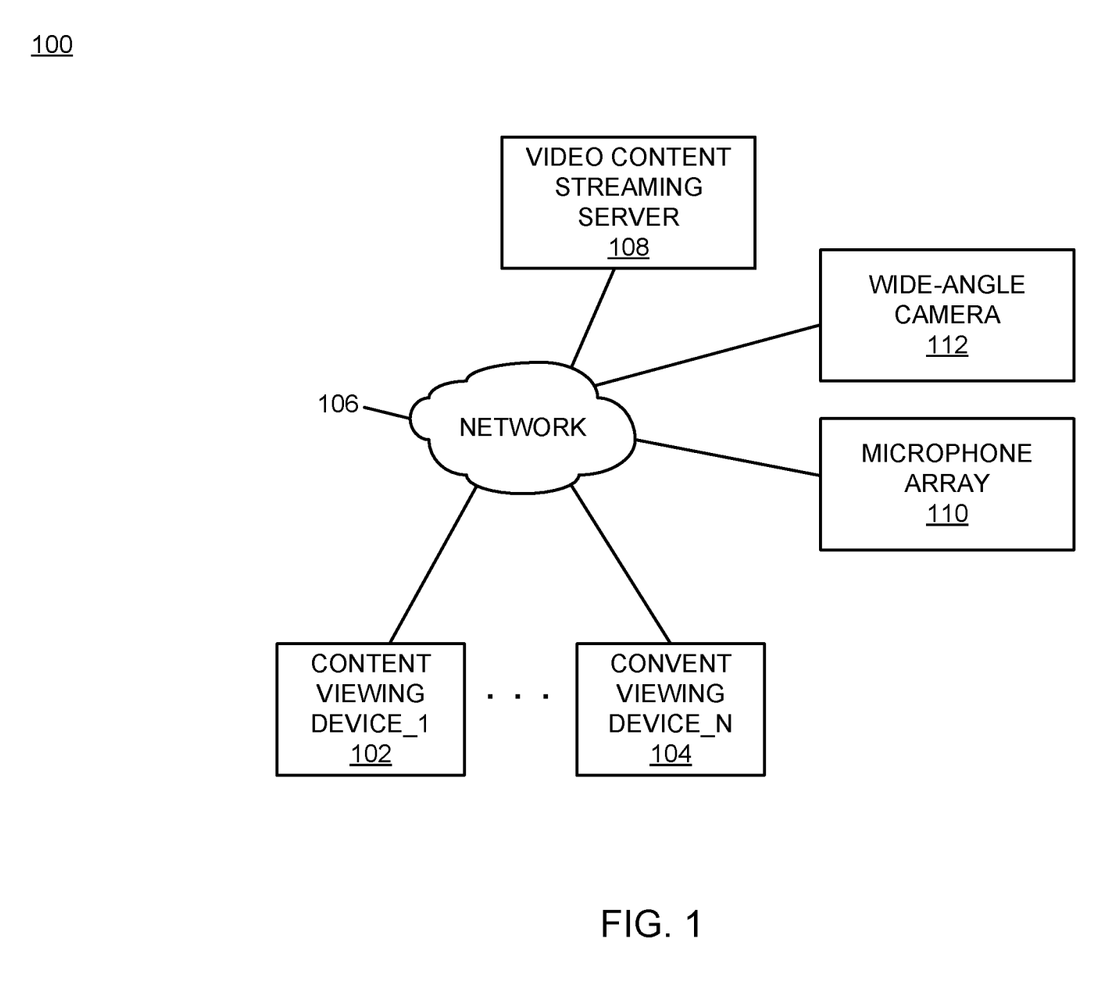
FIG. 1 is a block diagram of an example of an implementation of a system for aggregated region-based reduced bandwidth video streaming according to an embodiment of the present subject matter.

FIG. 1 is a block diagram of an example of an implementation of a system 100 for aggregated region-based reduced bandwidth video streaming. A content viewing device_1 102 through a content viewing device_N 104 communicate via a network 106 with other devices. The other devices include at least a video content streaming server 108, though other devices may be included as appropriate for a given implementation. For example, a microphone array 110 may operate as part of the system 100 to allow for individual microphone selection within a location of an event captured and transmitted within streamed video content (e.g., a conference room, presentation, or other event). Additionally, one or more wide angle cameras, such as the wide-angle camera 112, may operate as part of the system 100 to allow one or more video content capture perspectives.

Further, users of the content viewing device_1 102 through the content viewing device_N 104 may be considered remote viewers of streamed video content transmitted by the video content streaming server 108. It should additionally be noted that while the content viewing device_1 102 through the content viewing device_N 104 are indicated to be content "viewing" devices for purposes of describing operations by "remote viewers," one or more of the devices may also incorporate a camera and generate video content that is streamed by the video content streaming server 108 to other of the respective viewing devices (e.g., as part of a multicast transmission or other streamed video content).

As will be described in more detail below in association with FIG. 2 through FIG. 5, the video content streaming server 108 may provide automated aggregated region-based reduced bandwidth video streaming. The automated aggregated region-based reduced bandwidth video streaming is based upon receipt by the video content streaming server 108 of indications from different ones of the content viewing device_1 102 through the content viewing device_N 104 that identify sub-regions/areas of streamed video content that have been identified by the respective remote viewers to be of interest. The video content streaming server 108 defines an aggregated video content area of interest that includes within the streamed video content a combination/superset of each individual video content area of interest of each of the multiple remote viewers, and from that aggregated combination/superset designates video content outside of the aggregated video content area as a region that is not of interest (RNOI). The video content streaming server 108 then reduces video content changes to video content within the RNOI, where the reduced changes results in an effective frame rate content change reduction that reduces bandwidth used to transmit the RNOI in relation to the reduced effective frame rate. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The video content streaming server 108 may include any device capable of providing streamed video data for consumption by a device, such as the content viewing device_1 102 through the content viewing device_N 104, via a network, such as the network 106. The video content streaming server 108 may be one of the content viewing device_1 102 through the content viewing device_N 104, as appropriate for the given implementation. The video content streaming server 108 may include a web server, application server, or other data server device that is capable of streaming video content.

Figure 2:
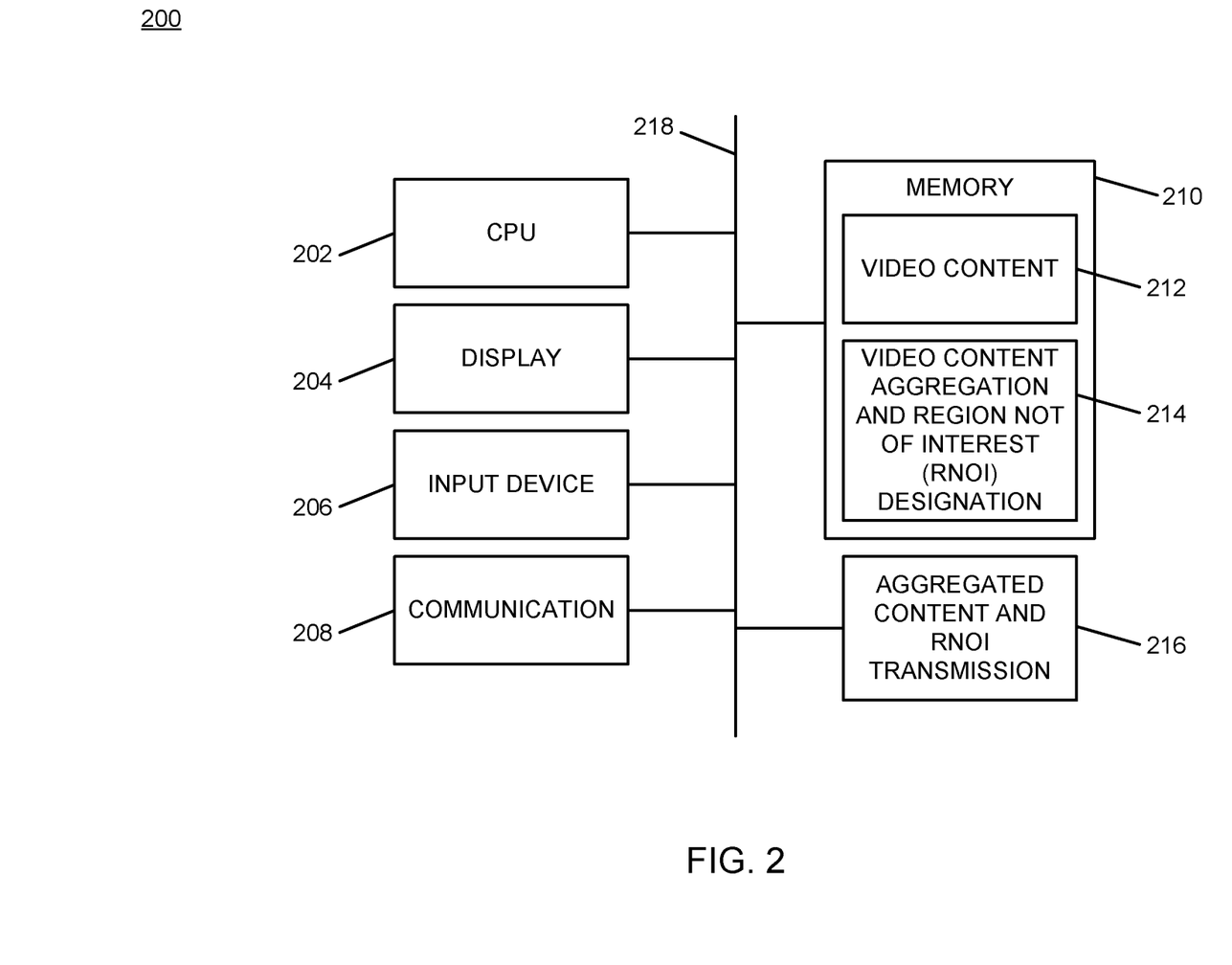
FIG. 2 is a block diagram of an example of an implementation of a core processing module capable of performing aggregated region-based reduced bandwidth video streaming according to an embodiment of the present subject matter.

FIG. 2 is a block diagram of an example of an implementation of a core processing module 200 capable of performing aggregated region-based reduced bandwidth video streaming. The core processing module 200 may be associated with the video content streaming server 108 and appropriate components of the core processing module 200 may be associated with the content viewing device_1 102 through the content viewing device_N 104, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of aggregated region-based reduced bandwidth video streaming in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices. The communications performed by the communication module 208 may include transmitting and/or receiving streamed video content (with or without audio), as appropriate for the given implementation.

A memory 210 includes a video content storage area 212 that stores streamed video content within the core processing module 200. As will be described in more detail below, streamed video content stored within the video content storage area 212 is used to transmit streamed video content within a region not of interest (RNOI) at a lower effective frame rate than content within an aggregated video content area of interest, thereby reducing bandwidth required to transmit the streamed video content.

The memory 210 also includes a video content aggregation and RNOI designation area 214. The video content aggregation and RNOI designation area 214 provides storage space for aggregating received indications of individual areas of interest and for determining/designating a RNOI area to be streamed at a reduced effective frequency.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An aggregated content and RNOI transmission module 216 is also illustrated. The aggregated content and RNOI transmission module 216 aggregates multiple received indications of individual areas of interest from remote viewers and identifies/designates an area outside of the aggregated area as the RNOI. The aggregated content and RNOI transmission module 216 provides bandwidth reduction of streamed video content for the core processing module 200, as described above and in more detail below. The aggregated content and RNOI transmission module 216 implements the automated aggregated region-based reduced bandwidth video streaming of the core processing module 200.

It should also be noted that the aggregated content and RNOI transmission module 216 may form a portion of other circuitry described without departure from the scope of the present subject matter. The aggregated content and RNOI transmission module 216 may form a portion of an interrupt service routine (ISR), a portion of an operating system, or a portion of an application without departure from the scope of the present subject matter. The aggregated content and RNOI transmission module 216 may also include an embedded device with circuitry designed specifically to perform the processing described herein as appropriate for a given implementation.

The CPU 202, the display 204, the input device 206, the communication module 208, the memory 210, and the aggregated content and RNOI transmission module 216 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. Accordingly, the core processing module 200 may take many forms and may be associated with many platforms.

Figure 3A:
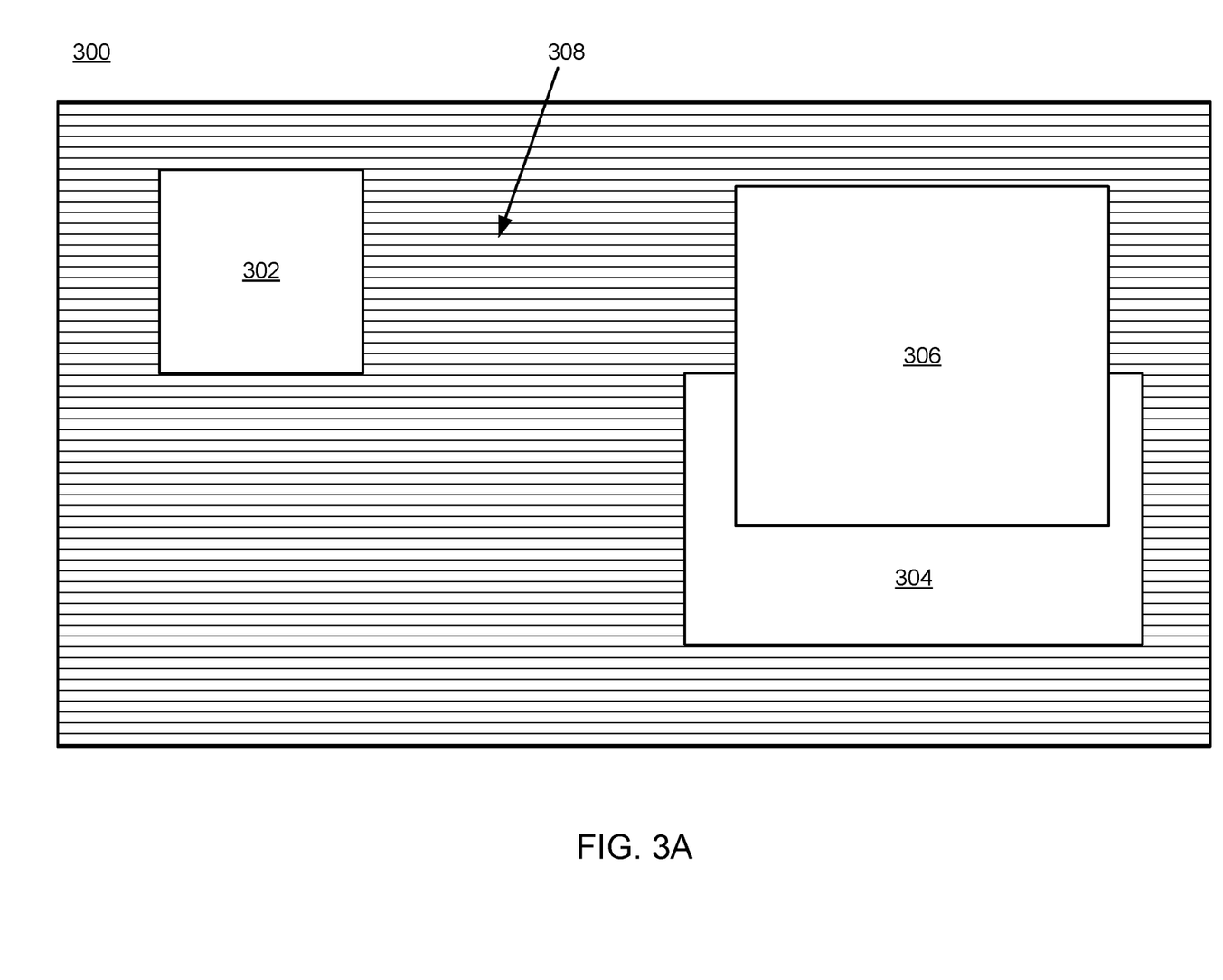
FIG. 3A is a diagram of an example of an implementation of a video frame that includes an aggregated set of individually-indicated areas of interest and a resulting region not of interest (RNOI) for which the effective frame rate and resulting transmission bandwidth may be reduced according to an embodiment of the present subject matter.

FIG. 3A is a diagram of an example of an implementation of a video frame 300 that includes an aggregated set of individually-indicated areas of interest 302, 304, and 306, and a resulting region not of interest (RNOI) 308 for which the effective frame rate and resulting transmission bandwidth may be reduced using the aggregated region-based reduced bandwidth video streaming associated with the present subject matter. The RNOI 308 is illustrated with horizontal line highlighting to clarify that all areas outside of the aggregated set of individually-indicated areas of interest 302, 304, and 306 may be operated upon to effectively reduce the frame rate of these areas.

As can be seen from FIG. 3A, the individually-indicated areas of interest 304 and 306 are overlapping areas. As such, the resulting aggregated set of individually-indicated areas of interest 302, 304, and 306 includes a union of the overlapping individually-indicated areas of interest 304 and 306, in combination with the individually-indicated area of interest 302.

For purposes of the present example, the video frame 300 may be an intra-coded frame (I-Frame) that fully encodes the entire video frame 300, and as such, the entire video frame 300 may be transmitted. As described above, for subsequent intermediate frames prior to the next I-Frame, the RNOI 308 may be frozen to be a still image so that no changes are available to transmit. As such, the only transmitted changes may be any changes that occur within the aggregated set of individually-indicated areas of interest 302, 304, and 306. By freezing the content within the RNOI 308, the bandwidth required to transmit the intermediate frames may be reduced, thereby effectively reducing the frame rate of the RNOI 308. The next I-Frame may again transmit an entire video frame of all content areas to allow the viewer to progress in time with viewing of the RNOI 308 in conjunction with the aggregated set of individually-indicated areas of interest 302, 304, and 306, and to avoid extended disparity between the respective aggregated set of individually-indicated areas of interest 302, 304, and 306 and the RNOI 308.

It should further be noted that a wide-angle lens may be used to capture the video frame 300 and remote viewer selections of different viewable content may be detected. As such, the aggregated set of individually-indicated areas of interest 302, 304, and 306 may not directly overlay or be "carved out of" the video frame as one contiguous image, but may instead be separate portions of image content that is overlaid onto a general scene (e.g., a conference presentation area or news location). Within this type of implementation, the RNOI 308 may also be non-contiguous video content relative to the aggregated set of individually-indicated areas of interest 302, 304, and 306.

Figure 3B:
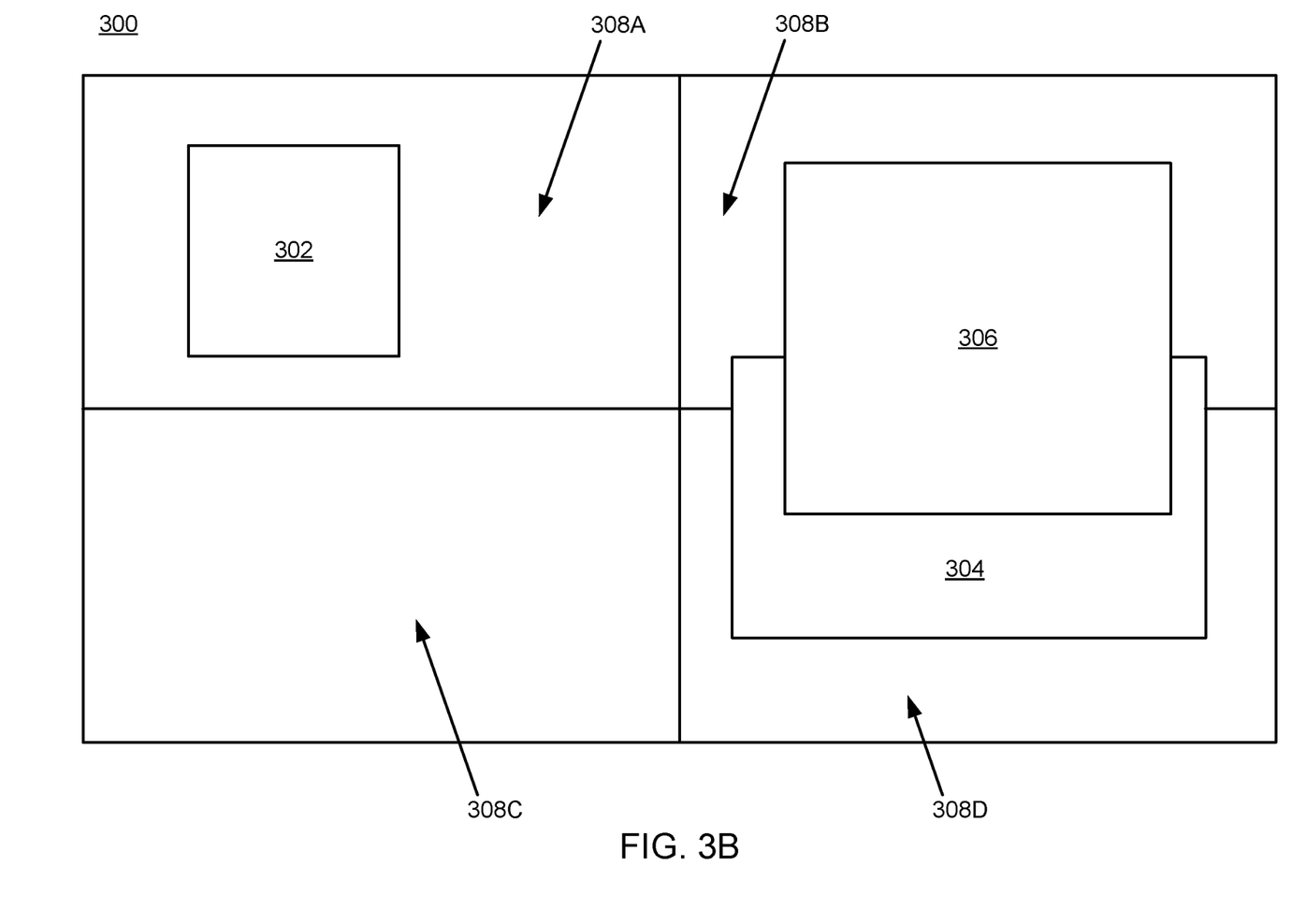
FIG. 3B is a diagram of an example of an implementation of the video frame of FIG. 3A with the resulting region not of interest (RNOI) partitioned into four (4) sub-regions according to an embodiment of the present subject matter.

FIG. 3B is a diagram of an example of an implementation of the video frame 300 of FIG. 3A with the resulting region not of interest (RNOI) 308 partitioned using a divisor of four (4) (e.g., the term "divisor" refers to the configured number of sections into which to partition the RNOI area), for purposes of example, where the RNOI 308 is divided/partitioned into four (4) sub-regions 308A, 308B, 308C, and 308D. The horizontal line highlighting has been removed from the RNOI 308 to assist with distinguishing the sub-regions 308A, 308B, 308C, and 308D within the drawing.

Sub-region processing of the RNOI 308 may be performed to provide the remote viewers with a more granular set of changes to the RNOI 308 between I-Frames. Each of the four sub-regions 308A, 308B, 308C, and 308D of the RNOI 308 may be captured at sequential intermediate frames and transmitted within the respective intermediate frames along with changes to video content within the aggregated set of individually-indicated areas of interest 302, 304, and 306. As such, bandwidth for the RNOI may still be reduced, while integrating the content changes of the RNOI 308 over time to allow the RNOI 308 to blend with changes to the aggregated set of individually-indicated areas of interest 302, 304, and 306.

It should be noted that the divisor of four (4) is utilized for purposes of example. However, other divisors may be used as appropriate for the given number of available intermediate frames pursuant to a particular encoding standard used to transmit streamed video content.

As such, the two examples described in association with FIG. 3A and FIG. 3B provide two options for effective frame rate reduction of RNOI areas and for reduction of the resulting transmission bandwidth to transmit video frames for which aggregated areas of interest have been identified by remote viewers. Other options for reducing bandwidth used to transmit RNOI areas are possible and all such options are considered within the scope of the present technology.

Figure 4:
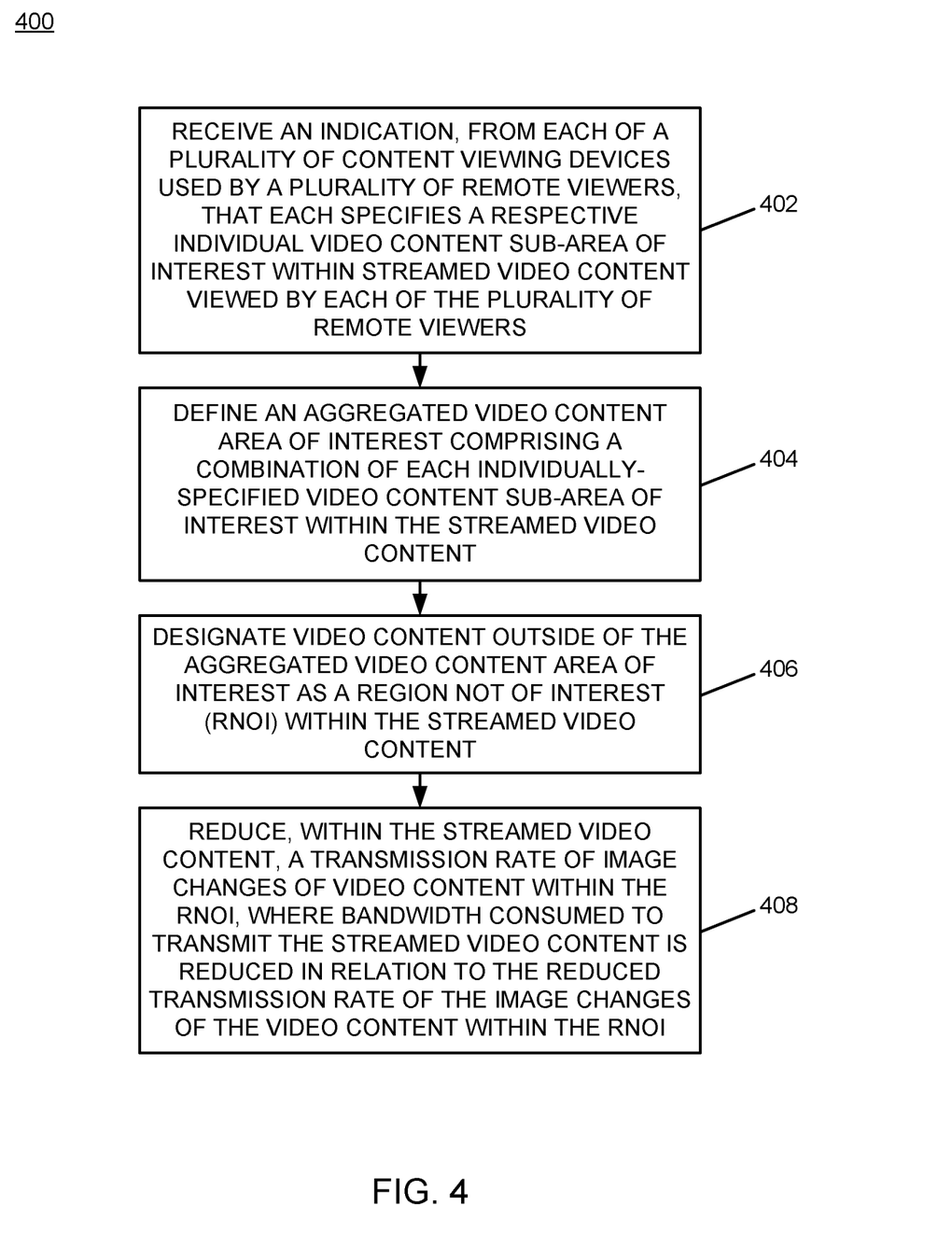
FIG. 4 is a flow chart of an example of an implementation of a process for aggregated region-based reduced bandwidth video streaming according to an embodiment of the present subject matter.
Figure 5:
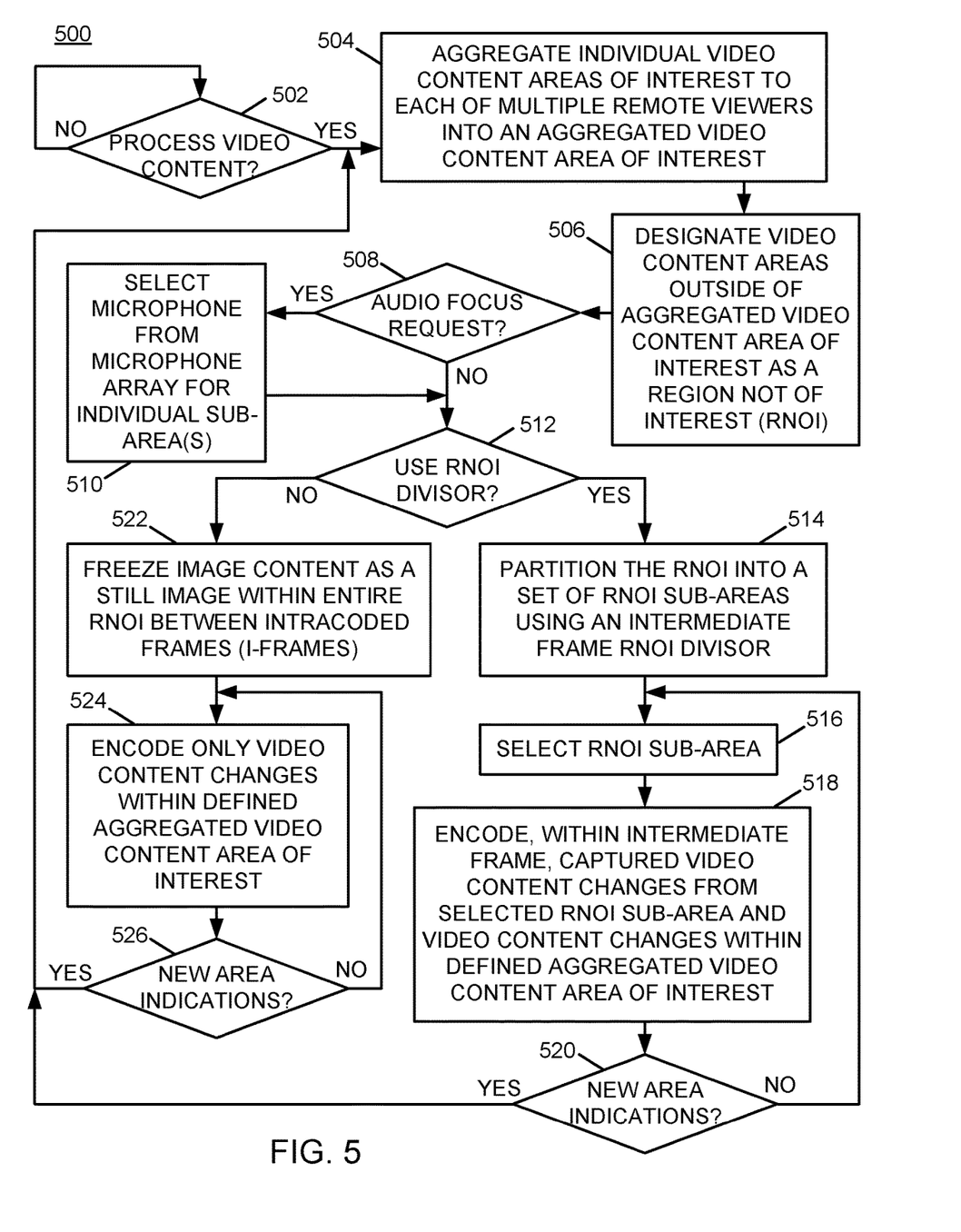
FIG. 5 is a flow chart of an example of an implementation of a process for aggregated region-based reduced bandwidth video streaming that includes audio focus processing and region not of interest (RNOI) divisor optional processing according to an embodiment of the present subject matter.

FIG. 4 through FIG. 5 described below represent example processes that may be executed by devices, such as the core processing module 200, to perform the automated aggregated region-based reduced bandwidth video streaming associated with the present subject matter. Many other variations on the example processes are possible and all are considered within the scope of the present subject matter. The example processes may be performed by modules, such as the aggregated content and RNOI transmission module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for aggregated region-based reduced bandwidth video streaming. The process 400 represents a computer-implemented method of performing the subject matter described herein. At block 402, the process 400 receives an indication, from each of a plurality of content viewing devices used by a plurality of remote viewers, that each specifies a respective individual video content sub-area of interest within streamed video content viewed by each of the plurality of remote viewers. At block 404, the process 400 defines an aggregated video content area of interest comprising a combination of each individually-specified video content sub-area of interest within the streamed video content. At block 406, the process 400 designates video content outside of the aggregated video content area of interest as a region not of interest (RNOI) within the streamed video content. At block 408, the process 400 reduces, within the streamed video content, a transmission rate of image changes of video content within the RNOI, where bandwidth consumed to transmit the streamed video content is reduced in relation to the reduced transmission rate of the image changes of the video content within the RNOI.

FIG. 5 is a flow chart of an example of an implementation of a process 500 for aggregated region-based reduced bandwidth video streaming that includes audio focus processing and region not of interest (RNOI) divisor optional processing. The process 500 represents a computer-implemented method of performing the subject matter described herein. At decision point 502, the process 500 makes a determination as to whether to begin processing video content. The determination to process video may be made in response to an initiation of a particular video broadcast (e.g., a video conference, a news story, etc.). The determination to process video may additionally and/or alternatively be made in response to receipt of one or more indications from content viewing devices used by remote viewers. Each of the received indications may identify a respective individual video content sub-area of interest within streamed video content viewed by each of the respective remote viewers. The determination to process video may further include receiving, from at least one of the remote viewers, a request to capture, via a wide angle lens, video content that is outside of the viewable area of the streamed video content. In such a situation, the process 500 may capture video content via the wide-angle lens that is outside of the viewable area of the streamed video content, and may overlay the captured video content onto an available area of a region not of interest (RNOI).

It should additionally be noted that to reduce complexity within the drawing, once the determination to process video content has been affirmed, processing of video content may continue until the particular video transmission has completed or until an alternative determination is made to stop processing video content according to the technology described herein. For example, processing associated with the process 500 may include switching video content streaming from an aggregated remote viewer interest view back to a general view, such as at the end of a video conference during closing remarks, at the end of a news story, or otherwise as appropriate for a given implementation.

In response to determining at decision point 502 to begin processing video content, the process 500 aggregates individual video content areas of interest to each of multiple remote viewers at block 504. For example, the process 500 may define the aggregated video content area of interest as a union of any overlapping individually-specified video content sub-areas of interest in combination with any non-overlapping individually-specified video content sub-areas of interest. As such, the aggregated video content area of interest may be non-contiguous within any particular frame of video content. It should additionally be noted that, where the process 500 iterates and a region not of interest (RNOI)

is already defined, the aggregation of video content areas of interest may include adding captured video content that is outside of the viewable area of the streamed video content to a defined aggregated video content area of interest. In such an implementation, the added captured video content may be further considered non-contiguous with the video content within the RNOI.

At block 506, the process 500 designates video a video content area outside of the aggregated area of interest as a region not of interest (RNOI). As described above and in more detail below, where the process 500 iterates to accept and process new requests for sub-areas of interest, the processing at block 506 may include adjusting and modifying a previously designated RNOI.

At decision point 508, the process 500 makes a determination as to whether any received indications of sub-areas of interest include an audio focus request. As described above, for situations such as conferences and certain other environments, microphone arrays may be utilized to allow remote viewers to focus on audio of different specified/selected sub-areas of the venue. In response to determining that an audio focus request has been received, the process 500 selects a microphone from a microphone array for the individual sub-area(s) for which the audio focus request has been received at block 510. For example, the process 500 may select a microphone from the microphone array that is proximate to (near) the requesting remote viewer's respective individual video content sub-area of interest within the streamed video content, and the process 500 may provide audio content within the streamed video content from the selected microphone.

In response to selecting a microphone from a microphone array for the individual sub-area(s) for which the audio focus request has been received at block 510, or in response to determining that an audio focus request has not been received at decision point 508, the process 500 makes a determination at decision point 512 as to whether to use an RNOI divisor to integrate changes within the RNOI area over time. As described above, the term "divisor" refers to a configured number of sections into which to partition the RNOI area. The process 500 may utilize a divisor of any size appropriate for a given number of intermediate frames within a particular format of video encoding. Further, the process 500 may perform round-robin or other selective encoding of captured video content changes from sequentially-selected RNOI sub-areas along with the video content changes within each individual video content sub-area of interest used to define the aggregated video content area of interest.

In response to determining at decision point 512 to use an RNOI divisor to partition the RNOI into different sub-areas and to thereby integrate changes within the RNOI area over time, the process 500 partitions the RNOI into a set of RNOI sub-areas using an intermediate frame RNOI divisor at block 514. For example, the process 500 may utilize a configured RNOI divisor of four (4) (or other divisor as appropriate for a given implementation) and may divide the RNOI area into four (4) sub-areas (e.g., regions, segments, etc.) that may then be sequentially updated with content changes during successive intermediate frames.

At block 516, the process 500 selects an RNOI sub-area. At block 518, the process 500 encodes, within an intermediate frame, captured video content changes from the selected RNOI sub-area of the set of RNOI sub-areas and video content changes within the defined aggregated video content area of interest. At decision point 520, the process 500 makes a determination as to whether new indications of sub-areas of interest have been received.

In response to determining that no new indications of sub-areas of interest have been received, the process 500 returns to block 516 and selects the next sub-area of the RNOI within which to process video content changes to integrate video content changes in the RNOI over time. As such, the process 500 selects, at successive intermediate frame times of the streamed video content between the I-Frames of the streamed video content, a different sequentially-selected RNOI sub-area of the set of RNOI sub-areas to be updated within successive intermediate frames of the streamed video content. The process 500 further encodes, within the successive intermediate frames of the streamed video content between the I-Frames, only captured image changes of the video content from the sequentially-selected RNOI sub-area of the set of RNOI sub-areas and the image changes of the video content within each individually-specified video content sub-area of interest used to define the aggregated video content area of interest. As described above, by deemphasizing content changes within the RNOI, the process 500 may reduce the bandwidth consumed to transmit the streamed video content.

In response to determining that one or more new indications of sub-areas of interest have been received at decision point 520, the process 500 returns to block 504 and integrates/adds the newly-specified areas of interest into the aggregated video content area of interest, and iterates as described above. As described above, the process 500 may iteratively augment the aggregated video content area of interest as remote viewer areas of interest change over time.

Returning to the description of decision point 512, in response to determining not to use an RNOI divisor to partition the RNOI into different sub-areas and to thereby integrate changes within the RNOI area over time, the process 500 freezes image content as a still image within the entire RNOI between intra-coded frames (I-Frames) at block 522. As such, the process 500 freezes the video content within the RNOI as a still image at intermediate frame times used to encode the image changes of the video content between intra-coded frames (I-Frames) of the streamed video content. As described above, by preventing changes to video content within the RNOI, the process 500 eliminates content changes within the RNOI and thereby may reduce the bandwidth consumed to transmit the streamed video content.

At block 524, the process 500 encodes only video content changes within the defined aggregated video content area of interest. As such, within intermediate frames of the streamed video content between the I-Frames, the process 500 encodes only image changes of the video content within each individually-specified video content sub-area of interest used to define the aggregated video content area of interest.

At decision point 526, the process 500 makes a determination as to whether new indications of sub-areas of interest have been received. In response to determining that no new indications of sub-areas of interest have been received, the process 500 returns to block 524 and encodes video content changes only for the defined aggregated video content areas of interest, and iterates as described above.

In response to determining that one or more new indications of sub-areas of interest have been received at decision point 526, the process 500 returns to block 504 and integrates/adds the newly-specified areas of interest into the aggregated video content area of interest, and iterates as described above. As described above, the process 500 may iteratively augment the aggregated video content area of interest as remote viewer areas of interest change over time. It is understood that newly-specified areas of interest may include a new/different area of interest specified by remote viewers that previously specified an area of interest, and that in such a circumstance the process 500 may remove the previously specified area(s) of interest from the aggregated video content area of interest. As such, the process 500 may iteratively adjust the aggregated video content area of interest in response to changes in the specified respective individual video content sub-areas of interest by remote viewers over time at block 504, and may iteratively adjust the RNOI within the streamed video content responsive to each iterative adjustment of the aggregated video content area of interest at block 506.

As described above, the process 500 defines an aggregated video content area of interest according to different individually-specified regions of interest to multiple remote viewers. The process 500 also designates areas of video content outside of the aggregated video content area of interest as a region not of interest (RNOI). The process 500 provides for audio focus within the respective individually-specified areas of interest. The process 500 further deemphasizes or eliminates video content changes within the RNOI during intermediate frames. As such, the process 500 may reduce the bandwidth consumed to transmit the streamed video content, which may further allow the streamed video content to reach remote viewers where a low-bandwidth connection exists between the streamed video content source and the respective remote viewers.

As described above in association with FIG. 1 through FIG. 5, the example systems and processes provide aggregated region-based reduced bandwidth video streaming. Many other variations and additional activities associated with aggregated region-based reduced bandwidth video streaming are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
   receiving an indication, from a content viewing device used by a remote viewer, that specifies a video content sub-area of interest within streamed video content viewed by the remote viewer;
   designating original video content outside of the video content sub-area of interest as a region not of interest (RNOI) within the streamed video content; and
   reducing, within the streamed video content, a transmission rate of image changes of the original video content within the RNOI, where image disparity between the video content sub-area of interest and the RNOI is reduced by continuing to transmit the image changes of the original video content within the RNOI at the reduced transmission rate and where bandwidth consumed to transmit the streamed video content is reduced in relation to the reduced transmission rate of the image changes of the original video content within the RNOI.

2. The computer-implemented method of claim 1, further comprising:
   adjusting, in response to receiving an additional indication of an additional video content sub-area of interest from the content viewing device used by the remote viewer, the RNOI to a union of (i) the video content sub-area of interest and (ii) the additional video content sub-area of interest.

3. The computer-implemented method of claim 1, where reducing, within the streamed video content, the transmission rate of the image changes of the original video content within the RNOI comprises:
   freezing the original video content within the RNOI as a still image at intermediate frame times used to encode the image changes of the original video content between intra-coded frames (I-Frames) of the streamed video content, where, by freezing the original video content within the RNOI between the I-Frames, the RNOI is updated with the image changes of the original video content at I-Frame boundaries; and
   encoding, within intermediate frames of the streamed video content between the I-Frames, only image changes of the original video content within the video content sub-area of interest.

4. The computer-implemented method of claim 1, where reducing, within the streamed video content, the transmission rate of the image changes of the original video content within the RNOI comprises:
   partitioning, using an intermediate frame RNOI divisor, the RNOI into a set of RNOI sub-areas;
   selecting, at successive intermediate frame times of the streamed video content between intra-coded frames (I-Frames) of the streamed video content, a different sequentially-selected RNOI sub-area of the set of RNOI sub-areas to be updated within successive intermediate frames of the streamed video content; and
   encoding, within the successive intermediate frames of the streamed video content between the I-Frames, only captured image changes of the original video content from the sequentially-selected RNOI sub-area of the set of RNOI sub-areas and the image changes of the original video content within the video content sub-area of interest.

5. The computer-implemented method of claim 1, further comprising:
   iteratively adjusting the video content sub-area of interest in response to changes to the video content sub-area of interest received from the content viewing device of the remote viewer over time; and
   iteratively adjusting the RNOI within the streamed video content responsive to each iterative adjustment of the video content sub-area of interest.

6. The computer-implemented method of claim 1, further comprising:
receiving, from the content viewing device used by the remote viewer, a request to capture, via a wide-angle lens, additional video content that is outside of a viewable area of the streamed video content;
capturing, via the wide-angle lens, the additional video content that is outside of the viewable area of the streamed video content; and
overlaying the captured additional video content onto an area of the RNOI.

7. The computer-implemented method of claim 1, where the streamed video content further comprises streamed audio content, and further comprising:
receiving an indication, from the content viewing device used by the remote viewer, that specifies an audio content sub-area of interest within the streamed video content;
selecting a microphone from a microphone array that is proximate to the specified audio content sub-area of interest within the streamed video content; and
providing audio content within the streamed video content from the selected microphone.

8. A system, comprising:
a communication module; and
a processor programmed to:
receive, via the communication module, an indication, from a content viewing device used by a remote viewer, that specifies a video content sub-area of interest within streamed video content viewed by the remote viewer;
designate original video content outside of the video content sub-area of interest as a region not of interest (RNOI) within the streamed video content; and
reduce, within the streamed video content, a transmission rate of image changes of the original video content within the RNOI, where image disparity between the video content sub-area of interest and the RNOI is reduced by continuing to transmit the image changes of the original video content within the RNOI at the reduced transmission rate and where bandwidth consumed to transmit the streamed video content is reduced in relation to the reduced transmission rate of the image changes of the video content within the RNOI.

9. The system of claim 8, where the processor is further programmed to:
adjust, in response to receiving an additional indication of an additional video content sub-area of interest from the content viewing device used by the remote viewer, the RNOI to a union of (i) the video content sub-area of interest and (ii) the additional video content sub-area of interest.

10. The system of claim 8, where, in being programmed to reduce, within the streamed video content, the transmission rate of the image changes of the original video content within the RNOI, the processor is programmed to:
freeze the original video content within the RNOI as a still image at intermediate frame times used to encode the image changes of the original video content between intra-coded frames (I-Frames) of the streamed video content, where, by freezing the original video content within the RNOI between the I-Frames, the RNOI is updated with the image changes of the original video content at I-Frame boundaries; and
encode, within intermediate frames of the streamed video content between the I-Frames, only image changes of the original video content within the video content sub-area of interest.

11. The system of claim 8, where, in being programmed to reduce, within the streamed video content, the transmission rate of the image changes of the original video content within the RNOI, the processor is programmed to:
partition, using an intermediate frame RNOI divisor, the RNOI into a set of RNOI sub-areas;
select, at successive intermediate frame times of the streamed video content between intra-coded frames (I-Frames) of the streamed video content, a different sequentially-selected RNOI sub-area of the set of RNOI sub-areas to be updated within successive intermediate frames of the streamed video content; and
encode, within the successive intermediate frames of the streamed video content between the I-Frames, only captured image changes of the original video content from the sequentially-selected RNOI sub-area of the set of RNOI sub-areas and the image changes of the original video content within the video content sub-area of interest.

12. The system of claim 8, where the processor is further programmed to:
iteratively adjust the video content sub-area of interest in response to changes to the video content sub-area of interest received from the content viewing device of the remote viewer over time; and
iteratively adjust the RNOI within the streamed video content responsive to each iterative adjustment of the video content sub-area of interest.

13. The system of claim 8, where the streamed video content further comprises streamed audio content, and the processor is further programmed to:
receive an indication, from the content viewing device used by the remote viewer, that specifies an audio content sub-area of interest within the streamed video content;
select a microphone from a microphone array that is proximate to the specified audio content sub-area of interest within the streamed video content; and
provide audio content within the streamed video content from the selected microphone.

14. A computer program product, comprising:
a computer readable storage medium having computer readable program code embodied therewith, where the computer readable storage medium is not a transitory signal per se and where the computer readable program code when executed on a computer causes the computer to:
receive an indication, from a content viewing device used by a remote viewer, that specifies a video content sub-area of interest within streamed video content viewed by the remote viewer;
designate original video content outside of the video content sub-area of interest as a region not of interest (RNOI) within the streamed video content; and
reduce, within the streamed video content, a transmission rate of image changes of the original video content within the RNOI, where image disparity between the video content sub-area of interest and the RNOI is reduced by continuing to transmit the image changes of the original video content within the RNOI at the reduced transmission rate and where bandwidth consumed to transmit the streamed video content is reduced in relation to the reduced transmission rate of the image changes of the original video content within the RNOI.

15. The computer program product of claim 14, where the computer readable program code when executed on the computer further causes the computer to:
adjust, in response to receiving an additional indication of an additional video content sub-area of interest from the content viewing device used by the remote viewer, the RNOI to a union of (i) the video content sub-area of interest and (ii) the additional video content sub-area of interest.

16. The computer program product of claim 14, where, in causing the computer to reduce, within the streamed video content, the transmission rate of the image changes of the original video content within the RNOI, the computer readable program code when executed on the computer causes the computer to:
freeze the original video content within the RNOI as a still image at intermediate frame times used to encode the image changes of the original video content between intra-coded frames (I-Frames) of the streamed video content, where, by freezing the original video content within the RNOI between the I-Frames, the RNOI is updated with the image changes of the original video content at I-Frame boundaries; and
encode, within intermediate frames of the streamed video content between the I-Frames, only image changes of the original video content within the video content sub-area of interest.

17. The computer program product of claim 14, where, in causing the computer to reduce, within the streamed video content, the transmission rate of the image changes of the original video content within the RNOI, the computer readable program code when executed on the computer causes the computer to:
partition, using an intermediate frame RNOI divisor, the RNOI into a set of RNOI sub-areas;
select, at successive intermediate frame times of the streamed video content between intra-coded frames (I-Frames) of the streamed video content, a different sequentially-selected RNOI sub-area of the set of RNOI sub-areas to be updated within successive intermediate frames of the streamed video content; and
encode, within the successive intermediate frames of the streamed video content between the I-Frames, only captured image changes of the original video content from the sequentially-selected RNOI sub-area of the set of RNOI sub-areas and the image changes of the original video content within the video content sub-area of interest.

18. The computer program product of claim 14, where the computer readable program code when executed on the computer further causes the computer to:
iteratively adjust the video content sub-area of interest in response to changes to the video content sub-area of interest received from the content viewing device of the remote viewer over time; and
iteratively adjust the RNOI within the streamed video content responsive to each iterative adjustment of the video content sub-area of interest.

19. The computer program product of claim 14, where the computer readable program code when executed on the computer further causes the computer to:
receive, from the content viewing device used by the remote viewer, a request to capture, via a wide-angle lens, additional video content that is outside of a viewable area of the streamed video content;
capture, via the wide-angle lens, the additional video content that is outside of the viewable area of the streamed video content; and
overlay the captured additional video content onto an area of the RNOI.

20. The computer program product of claim 14, where the streamed video content further comprises streamed audio content, and the computer readable program code when executed on the computer further causes the computer to:
receive an indication, from the content viewing device used by the remote viewer, that specifies an audio content sub-area of interest within the streamed video content;
select a microphone from a microphone array that is proximate to the specified audio content sub-area of interest within the streamed video content; and
provide audio content within the streamed video content from the selected microphone.

* * * * *